(12) United States Patent
Choudhary

(10) Patent No.: US 8,922,573 B1
(45) Date of Patent: Dec. 30, 2014

(54) VIDEO NON-BUFFERED LINE MEMORY

(75) Inventor: Saif Choudhary, Santa Clara, CA (US)

(73) Assignee: Imagination Technologies Limited (GB)

( * ) Notice: Subject to any disclaimer, the term of this patent is extended or adjusted under 35 U.S.C. 154(b) by 1415 days.

(21) Appl. No.: 12/502,927

(22) Filed: Jul. 14, 2009

(51) Int. Cl.
G09G 5/36 (2006.01)
G09G 5/39 (2006.01)
G06F 12/02 (2006.01)

(52) U.S. Cl.
USPC .......................... 345/547; 345/531; 345/544

(58) Field of Classification Search
CPC .. G09G 5/395; G09G 5/393; H04N 19/00278
USPC .............. 345/530, 531, 544, 547; 375/240.24
See application file for complete search history.

(56) References Cited

U.S. PATENT DOCUMENTS

| | | | |
|---|---|---|---|
| 5,872,577 A * | 2/1999 | Perrin | 345/535 |
| 6,130,680 A * | 10/2000 | Cox et al. | 345/544 |
| 7,813,432 B2 * | 10/2010 | Wang | 375/240.24 |
| 2007/0011364 A1 * | 1/2007 | Wezelenburg | 710/22 |
| 2008/0273598 A1 | 11/2008 | Shon et al. | |
| 2008/0310515 A1 * | 12/2008 | Matsuba et al. | 375/240.24 |
| 2009/0132771 A1 * | 5/2009 | Wang | 711/154 |

* cited by examiner

*Primary Examiner* — Joni Richer
(74) *Attorney, Agent, or Firm* — Marger Johnson & McCollom PC

(57) ABSTRACT

A non-buffered video line memory eliminates the need for double buffering video data during processing. While most double buffering systems double the amount of memory necessary to store video data, a non-buffered approach reduces the hardware memory costs substantially. A set of write and read pointers coupled with write and read incrementors allows data to be stored in raster order and removed in block order from a non-buffered memory device. The incrementors, in conjunction with a set of write and read pointers generate a base address for data to be written to and read from the non-buffered memory at substantially the same time. Encoding systems benefit substantially by being able to read and write information into a common memory rather than continuously switching between two different memories, by reducing complexity and cost.

28 Claims, 14 Drawing Sheets

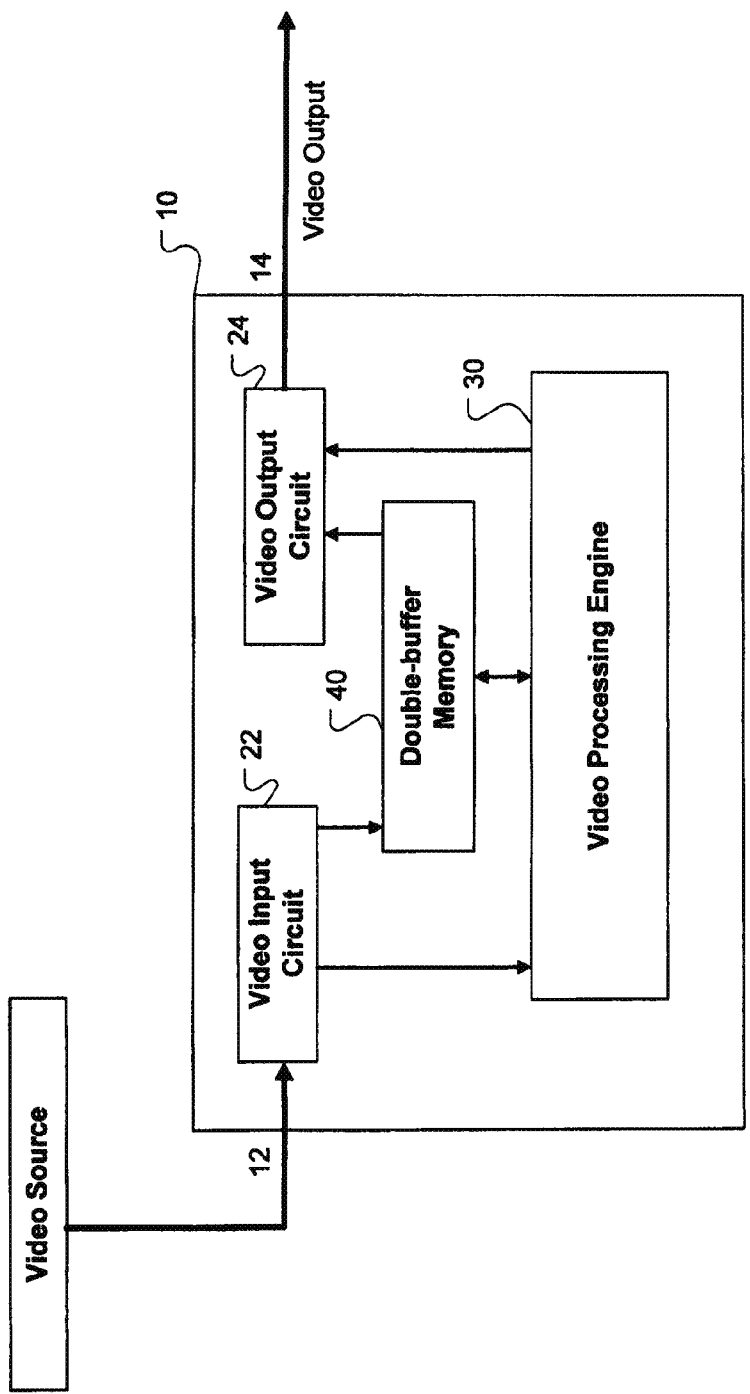
FIG. 1 (Conventional)

| | 0 | 1 | 2 | 3 | 4 | 5 |
|---|---|---|---|---|---|---|
| | B0-B7 | C0-C7 | D0-D7 | E0-E7 | F0-F7 | |
| 6 | B8-B15 | C8-C15 | D8-D15 | E8-E15 | 10 | 11 |
| 12 | B16-B23 | C16-C23 | D16-D23 | E16-E23 | 16 | 17 |
| 18 | B24-B31 | C24-C31 | D24-D31 | E24-E31 | 22 | 23 |
| 24 | B32-B39 | C32-C39 | D32-D39 | E32-E39 | 28 | 29 |
| 30 | B40-B47 | C40-C47 | D40-D47 | E40-E47 | 34 | 35 |
| 36 | B48-B55 | C48-C55 | D48-D55 | E48-E55 | 40 | 41 |
| 42 | B56-B63 | C56-C63 | D56-D63 | E56-E63 | 46 | 47 |

| A0-A7 |
|---|
| A8-A15 |
| A16-A23 |
| A24-A31 |
| A32-A39 |
| A40-A47 |
| A48-A55 |
| A56-A63 |

First Block Read 40
41 First Memory Buffer

| | 0 | 1 | 2 | 3 | 4 | 5 |
|---|---|---|---|---|---|---|
| A0-A7 | B0-B7 | C0-C7 | D0-D7 | E0-E7 | F0-F7 | |
| A8-A15 | B8-B15 | | | | | 11 |
| 12 | 13 | | | 15 | 16 | 17 |
| 18 | 19 | | | 21 | 22 | 23 |
| 24 | 25 | | | 27 | 28 | 29 |
| 30 | 31 | | | 33 | 34 | 35 |
| 36 | 37 | | | 39 | 40 | 41 |
| 42 | 43 | 44 | 45 | | 46 | 47 |

42 Second Memory Buffer

FIG. 2
(Conventional)

| A0 - A3 | B0 - B3 | C0 - C3 | D0 - D3 | E0 - E3 | F0 - F3 | G0 - G3 |
|---|---|---|---|---|---|---|
| 0 | 1 | 2 | 3 | 4 | 5 | 6 |
| A4 - A7 | B4 - B7 | C4 - C7 | D4 - D7 | E4 - E7 | F4 - F7 | G4 - G7 |
| 7 | 8 | 9 | 10 | 11 | 12 | 13 |
| A8 - A11 | B8 - B11 | C8 - C11 | D8 - D11 | E8 - E11 | F8 - F11 | G8 - G11 |
| 14 | 15 | 16 | 17 | 18 | 19 | 20 |
| A12 - A15 | B12 - B15 | C12 - C15 | D12 - D15 | E12 - E15 | F12 - F15 | G12 - G15 |
| 21 | 22 | 23 | 24 | 25 | 26 | 27 |

Write Pointer Initialize: 0
Write Pointer Increment: 1

Read Pointer Initialize: 0
Read Pointer Increment: 7

FIG. 3A

| A0 - A3 | E0 - E3 | B4 - B7 | F4 - F7 | C8 - C11 | G8 - G11 | D12 - D15 |
|---|---|---|---|---|---|---|
| 0 | 1 | 2 | 3 | 4 | 5 | 6 |
| B0 - B3 | F0 - F3 | C4 - C7 | G4 - G7 | D8 - D11 | A12 - A15 | E12 - E15 |
| 7 | 8 | 9 | 10 | 11 | 12 | 13 |
| C0 - C3 | G0 - G3 | D4 - D7 | A8 - A11 | E8 - E11 | B12 - B15 | F12 - F15 |
| 14 | 15 | 16 | 17 | 18 | 19 | 20 |
| D0 - D3 | A4 - A7 | E4 - E7 | B8 - B11 | F8 - F11 | C12 - C15 | G12 - G15 |
| 21 | 22 | 23 | 24 | 25 | 26 | 27 |

Write Pointer Initialize: 0
Write Pointer Increment: 7

Read Pointer Initialize: 0
Read Pointer Increment: 22

FIG. 3B

| A0 - A3 | C8 - C12 | F0 - F3 | A12 - A15 | D4 - D7 | F12 - F15 | B8 - B11 |
|---|---|---|---|---|---|---|
| 0 | 1 | 2 | 3 | 4 | 5 | 6 |
| E0 - E3 | G8 - G11 | C4 - C7 | E12 - E15 | A8 - A11 | D0 - D3 | F8 - F11 |
| 7 | 8 | 9 | 10 | 11 | 12 | 13 |
| B4 - B7 | D12 - D15 | G4 - G7 | C0 - C4 | E8 - E11 | A4 - A7 | C12 - C15 |
| 14 | 15 | 16 | 17 | 18 | 19 | 20 |
| F4 - F7 | B0 - B3 | D8 - D11 | G0 - G3 | B12 - B15 | E4 - E7 | G12 - G15 |
| 21 | 22 | 23 | 24 | 25 | 26 | 27 |

Write Pointer Initialize: 0
Write Pointer Increment: 22

Read Pointer Initialize: 0
Read Pointer Increment: 19

FIG. 3C

| A0 - A3 | D4 - D7 | G8 - G11 | D0 - D3 | G4 - G7 | C12 - C15 | G0 - G3 |
|---|---|---|---|---|---|---|
| 0 | 1 | 2 | 3 | 4 | 5 | 6 |
| C8 - C11 | F12 - F15 | C4 - C7 | F8 - F11 | C0 - C3 | F4 - F7 | B12 - B15 |
| 7 | 8 | 9 | 10 | 11 | 12 | 13 |
| F0 - F3 | B8 - B11 | E12 - E15 | B4 - B7 | E8 - E11 | B0 - B4 | E4 - E7 |
| 14 | 15 | 16 | 17 | 18 | 19 | 20 |
| A12 - A15 | E0 - E3 | A8 - A11 | D12 - D15 | A4 - A7 | D8 - D11 | G12 - G15 |
| 21 | 22 | 23 | 24 | 25 | 26 | 27 |

Write Pointer Initialize: 0
Write Pointer Increment: 19

Read Pointer Initialize: 0
Read Pointer Increment: 25

FIG. 3D

| A0 - A3 | G4 - G7 | F12 - F15 | F4 - F7 | E12 - E15 | E4 - 47 | D12 - D15 |
|---|---|---|---|---|---|---|
| 0 | 1 | 2 | 3 | 4 | 5 | 6 |
| D4 - D7 | C12 - C15 | C4 - C7 | B12 - B15 | B4 - B7 | A12 - A15 | A4 - A7 |
| 7 | 8 | 9 | 10 | 11 | 12 | 13 |
| G8 - G11 | G0 - G3 | F8 - F11 | F0 - F3 | E8 - E11 | E0 - E3 | D8 - D11 |
| 14 | 15 | 16 | 17 | 18 | 19 | 20 |
| D0 - D3 | C8 - C11 | C0 - C3 | B8 - B11 | B0 - B3 | A8 - A11 | G12 - G15 |
| 21 | 22 | 23 | 24 | 25 | 26 | 27 |

Write Pointer Initialize: 0
Write Pointer Increment: 25

Read Pointer Initialize: 0
Read Pointer Increment: 13

FIG. 3E

| A0 - A4 | B0 - B4 | C0 - C4 | D0 - D4 | E0 - E4 |
|---|---|---|---|---|
| 0 | 1 | 2 | 3 | 4 |
| A5 - A9 | B5 - B9 | C5 - C9 | D5 - D9 | E5 - E9 |
| 5 | 6 | 7 | 8 | 9 |
| A10 - A14 | B10 - B14 | C10 - C14 | D10 - D14 | E10 - E14 |
| 10 | 11 | 12 | 13 | 14 |

Write Pointer Initialize: 0
Write Pointer Increment: 1

Read Pointer Initialize: 0
Read Pointer Increment: 5

FIG. 4A

| A0 - A4 | D0 - D4 | B5 - B9 | E5 - E9 | C10 - C14 |
|---|---|---|---|---|
| 0 | 1 | 2 | 3 | 4 |
| B0 - B4 | E0 - E4 | C5 - C9 | A10 - A14 | D10 - D14 |
| 5 | 6 | 7 | 8 | 9 |
| C0 - C4 | A5 - A9 | D5 - D9 | B10 - B14 | E10 - E14 |
| 10 | 11 | 12 | 13 | 14 |

Write Pointer Initialize: 0
Write Pointer Increment: 5

Read Pointer Initialize: 0
Read Pointer Increment: 11

FIG. 4B

| A0 - A4 | E5 - E9 | E0 - E4 | D10 - D14 | D5 - D9 |
|---|---|---|---|---|
| 0 | 1 | 2 | 3 | 4 |
| D0 - D4 | C10 - C14 | C5 - C9 | C0 - C4 | B10 - B14 |
| 5 | 6 | 7 | 8 | 9 |
| B5 - B9 | B0 - B4 | A10 - A14 | A5 - A9 | E10 - E14 |
| 10 | 11 | 12 | 13 | 14 |

Write Pointer Initialize: 0
Write Pointer Increment: 11

Read Pointer Initialize: 0
Read Pointer Increment: 13

FIG. 4C

VIDEO NON-BUFFERED LINE MEMORY

TECHNICAL FIELD

This disclosure relates to memory management, and more particularly, to memory management in video processors and other devices.

BACKGROUND

Video processors typically require large amounts of memory to temporarily store video data during operations. With reference to FIG. 1, a video processor 10 is illustrated having a video input 12 to an input circuit 22 and a modified video output 14 from an output circuit 24. A video processor engine 30 performs the majority of the processing of the video data. The video processor engine may have a different function depending on the desired modified video output. For instance, the video processor engine 30 may perform a compression function, an encryption function, a motion estimation function, or a pattern recognition function. In other embodiments the video processor 10 may include multiple video processor engines 30 each of which performs a different function. Regardless of the particular type of video processor engine 30 that is present in the video processor 10, the necessity for a large amount of memory is universal in any video processor 10.

Memory in a video processor is typically one of two main types. The main memory is standard Random Access Memory that is used for general data storage, oftentimes in multiple portions of a video processor as needed. The other memory type is an input line buffer memory, which is used to convert video data streamed in raster format to blocks of video commonly called macroblocks. Typically these input line buffer memories are double-buffer memories and they store multiple lines of video data at a time. This process is explained with reference to FIG. 2.

In FIG. 2 the memory includes two separate line buffer memories, a first line buffer memory 40 and a second line buffer memory 42. Each of the line buffer memories 40, 42 includes, in this example, 8 lines of storage or forty-eight storage locations where each storage location stores 8 pieces, or pixels, of data, which corresponds to an 8×8 block size. Line buffer memories are typically sized based on the block size of the video system, and can be any size. 16×16 sized blocks are very common as well. In FIG. 2 the storage locations are numbered 0-47 for each of the line buffer memories 40, 42.

Video data is initially stored in the first line buffer memory 40. Video data is sent to the line buffer memory in "raster scan" order, which means data begins in location 0 with data A0-A7, then fills location 1 with B0-B7, then fills location 2 with C0-C7, etc., until the first line buffer memory 40 is completely full by writing F56-F63 in location 47. Although data is written to the first line buffer memory 40 in scan order, it is typically read in "block" or "macroblock" order, because most video processing is performed on groups, or blocks, of data. As described above, block can be any size, but are shown as 8×8 in this example.

To read block "A," the data A0-A7 is read from location 0, data A8-A15 is read from location 6, data A16-A23 is read from location 12, data A24-A31 is read from location 18, data A32-A39 is read from location 24, data A40-A47 is read from location 30, data A48-A55 is read from location 36, and data A56-A63 is read from location 42, as illustrated in FIG. 2.

In double buffering systems, as first line buffer memory 40 is being emptied, the second line buffer memory 42 is being filled with a next set of video data. Otherwise, if there were only one line buffer memory, the video processor 10 would have to wait until the first line buffer memory 40 was nearly empty before it could begin to write the raster scan data into the top row of the line buffer memory. For instance, it is impossible to write data in the position 2 of the first line buffer memory 40 until the third block (block C in the illustrated example) has been read. Using a double buffering system, as illustrated in FIG. 2, allows the video data to be written to one of the line buffer memories at the same rate as it is read from the other line buffer memories because the system does not have to wait until the first line buffer memory is nearly empty before writing a next set of data to the second line buffer memory. Instead, the video system can immediately begin writing data to the second line buffer memory 42 as the first line buffer memory 40 is being read. When the first line buffer memory 40 is completely empty, data is then read from the second line buffer memory 42, which is now full, and the cycle repeats by writing data again to the first line buffer memory 40.

In the example of FIG. 2, a first block, block "A," has been read from the first line buffer memory 40 as illustrated by the reference 41 of FIG. 2. Because eight of the 48 locations have been read from the first line buffer memory 40, likewise eight of the 48 locations have been written to in the second line buffer memory 42. As described above, as data is read from one of the line buffer memories 40, 42 in the double buffering system, data is written into the other of the buffers. Note that the blocks are read in block order but written in scan order.

Modern video systems include large line buffer memories to temporarily store lines of video data as they are sent to the video processor in raster order. Because each frame of a progressive scan 1080p HD video has a width of 1920 pixels, each of the line buffer memories in a double buffering system has a width of 1920 storage locations and a depth equal to the number of rows in a standard block. In the H.264 standard, standard macroblocks are 16×16, thus any double buffer system would include two copies of a 16×1920 memory.

Embodiments of the invention address these and other limitations in the prior art.

BRIEF DESCRIPTION OF THE DRAWINGS

FIG. 1 is a block diagram illustrating a conventional video processor.

FIG. 2 is a block diagram illustrating a conventional double-buffer memory system.

FIGS. 3A-3E are block diagrams illustrating an example of a non-buffered memory system according to embodiments of the invention being filled and emptied over multiple cycles.

FIGS. 4A-4C are block diagrams illustrating an example of an irregular sized non-buffered memory system according to embodiments of the invention being filled and emptied over multiple cycles.

DETAILED DESCRIPTION

FIG. 3A is a block diagram of a non-buffered memory system according to embodiments of the invention. In FIG.

3A, a line memory 100 includes twenty-eight memory locations, labeled 0-27, each of which stores four pixels of data. Thus, a block "A" of data stored in locations 0, 7, 14, and 21 is a 4×4 block of data having 16 values total, labeled A0-A15. In line memory 100, there are locations for seven 4×4 blocks of data. As used in this description, the line memory 100 is seven words wide, or has a width W of seven, while the 4×4 sizing in this example gives a block size N of 4. Embodiments of the invention, however, operate in the same manner no matter how many words W are in the line memory 100, no matter what the block size is, N×N, and no matter if the block size is a square block. In other words, it works for both N×N blocks and N×M blocks. In an N×M system, N reflects the number of lines in the block and M reflects the number of columns in the block.

Figure 5:
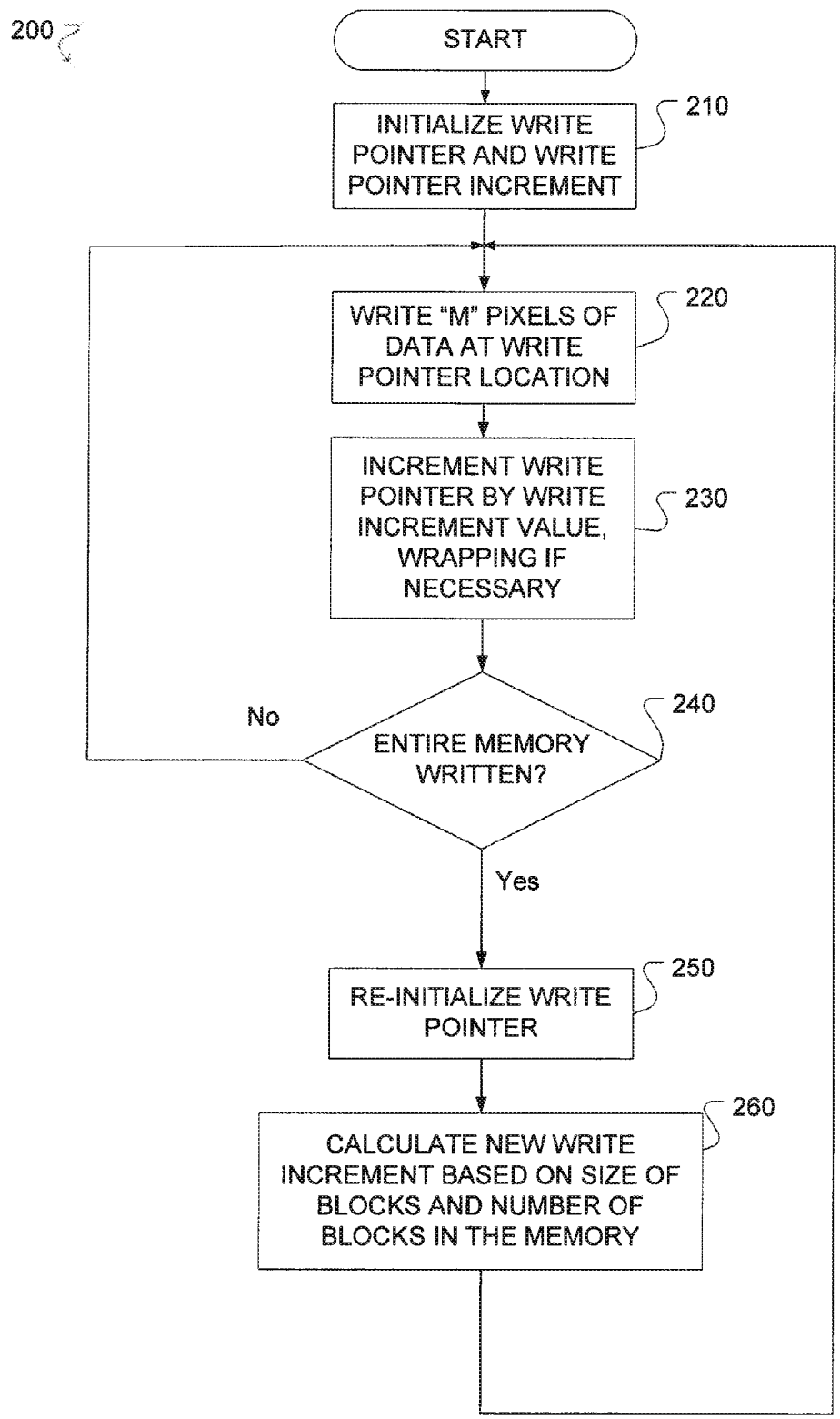
FIG. 5 is an example flow diagram illustrating a process for generating a write pointer according to embodiments of the invention.

As an initial process, data is loaded into the line memory 100 in raster scan order. An example process to set a write pointer that determines which location in the line memory 100 the next set of data will be written to is illustrated in FIG. 5. With respect to FIG. 5, a flow 200 illustrates how the write pointer is set. The flow 200 may be used each time the line memory 100 is written to, as described below.

The flow 200 commences at a process 210 where two values are initialized, a write pointer value and a write pointer increment value, also referred to as the write increment. The write pointer indicates the next location or locations in the line memory 100 to be written, while the write pointer increment is a value used to determine a next value of the write pointer. In the first use of the line memory 100, the write pointer is initiated to 0 and the write increment is initialized to 1.

In a process 220, "M" pixels of data are written at the current write pointer location. In this description, "M" pixels reflects the number of columns in the block. In a square, N×N block, the process 320 would read "N" pixels, of course. Because the write pointer was initialized to 0 in the process 210, the first set of data A0-A3, which is four pixels worth of data, is written into location 0, as illustrated in FIG. 3A. In a process 230 (FIG. 5), the write pointer is incremented by the write increment value. In this current cycle, the write increment value is "1," and therefore the current write pointer value is incremented by "1" from its current state of "0" to become "1." Next, a process 240 determines if the entire memory 100 has been completely written. Because it has not been completely written yet, the flow 200 cycles back to the process 220 where the set of data B0-B4 is written into the memory location 1 of the line memory 100. Recall that a video system typically writes video data in scan order, A0-A3, B0-B3, C0-C3, etc.

The process continues as described above, with the write pointer being incremented by a write increment value (currently "1") and each set of data being written until all of the data A0-A3 through G12-G15 is written in the twenty-eight memory locations 0-27 of the line memory 100 as illustrated in FIG. 3A.

After the last piece of data for the first block "A" has been written into the line memory 100, i.e., A12-A15 has been written to location 21, a process to read data from the memory buffer can begin. In other embodiments the reading process begins only after the line memory 100 is completely full, i.e., after location 27 has been written to.

To read a set of data, the reading process needs to know where to read data from. Similar to the write pointer described above, embodiments of the invention use a read pointer and a read pointer increment, referred to as the read increment, to determine which set of data to read next.

Figure 6:
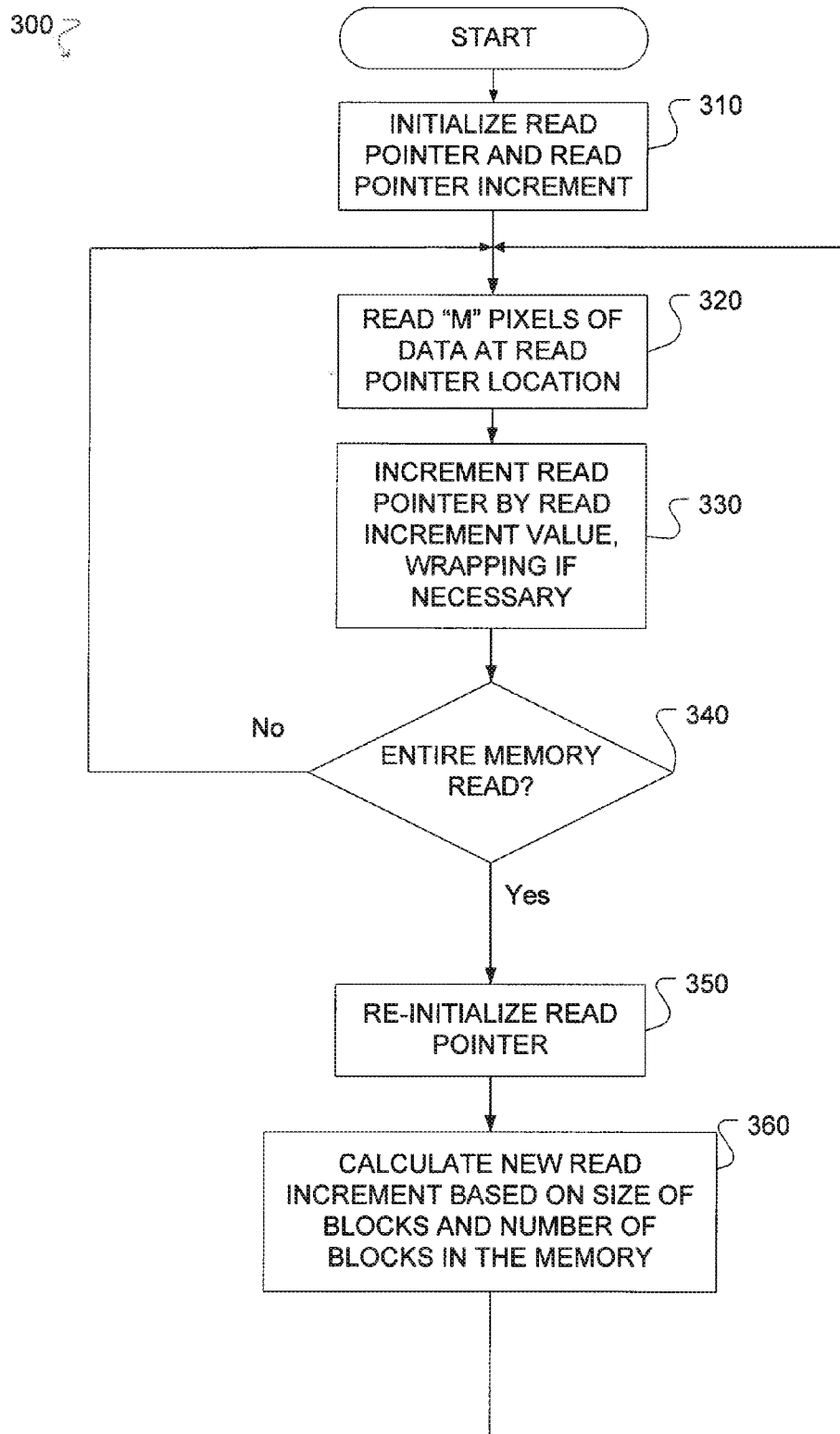
FIG. 6 is an example flow diagram illustrating a process for generating a read pointer according to embodiments of the invention.

FIG. 6 illustrates an example flow 300 according to embodiments of the invention that sets the read pointer so that data can be read from the line memory 100 in a desired order. The flow 300 starts at a process 310 that initializes the read pointer to "0" and the read increment to the value "W." Recall from above that W represents the number of block widths stored in the line memory 100, which in the examples illustrated with reference to FIGS. 3A-3E is "7".

A process 320 specifies that "M" pixels of data are read from the current read pointer, with "M" reflecting the number of columns of data within a single block. In a square block, N×N, the process 320 would read "N" pixels, of course. With reference back to FIG. 3A, the first data read from the line memory 100 is A0-A3 from memory location 0. A process 330 in the flow 300 then increments the read pointer by the read increment, which in this cycle is "7," thus, because the read increment is "7" and the read pointer is currently "0," the flow 300 increments the read pointer to "7" in the process 320.

A process 340 determines that the read process is not yet complete and the flow returns to the process 320 for a second time to read another set of pixels. In the second cycle, because the current read pointer is "7," the data values A4-A7 are read from memory location 7 of the line memory 100 and the read pointer is incremented to "14" in the process 330. The process 340 determines whether the entire line memory 100 has been read. In this example case, the process 340 exits in the negative direction and returns back to the process 320 where the third set of data, A8-A11 is read from the memory location 14. The flow 300 repeats the process a fourth time to read the fourth set of data A12-A15 from the memory location 21, at which time the entire 4×4 block "A" has been read from the line memory 100.

After the entire block "A" has been read in the process 320, the flow 300 in FIG. 6 continues to the process 330 to increment the read pointer. Because the read pointer is currently set to "21" and the read increment is set to 7, the new read pointer is incremented to "28," however there is no location "28" in the line memory 100, which has locations numbered from 0-27. Instead, the process 330 "wraps" the read pointer around the memory buffer by subtracting the highest value in the line memory 100, "27," from the incremented value 28 to yield a final read pointer value of "1." Inspection of location "1" of the line memory 100 in FIG. 3A confirms that it holds the pixel data B0-B3, which is exactly the next piece of data desired to be read by the read process.

The flow 300 continues to read data block "B" (pixels B0-B15) by reading data from locations 1, 8, 15, and 22 by cycling through the processes 320, 330, and 340, where the read pointer started at location "1" and the read increment value remains set at "7." Then blocks "C," "D," and "E," are read in succession as well, all using the flow 300 of FIG. 6.

For the example illustrated in FIG. 3A, the Write and Read pointer locations, along with the data written to or read from those locations, is shown in Table A.

TABLE A

| Write location | Write data | Read location | Read data |
|---|---|---|---|
| 0 | A0-A3 | 0 | A0-A3 |
| 1 | B0-B3 | 7 | A4-A7 |
| 2 | C0-C3 | 14 | A8-A11 |
| 3 | D0-D3 | 21 | A12-A15 |
| 4 | E0-E3 | 1 | B0-B3 |
| 5 | F0-F3 | 8 | B4-B7 |
| 6 | G0-G3 | 15 | B8-B11 |
| 7 | A4-A7 | 22 | B12-B15 |

TABLE A-continued

| Write location | Write data | Read location | Read data |
|---|---|---|---|
| 8 | B4-B7 | 2 | C0-C3 |
| 9 | C4-C7 | 9 | C4-C7 |
| 10 | D4-D7 | 16 | C8-C11 |
| 11 | E4-E7 | 23 | C12-C15 |
| 12 | F4-F7 | 3 | D0-D3 |
| 13 | G4-G7 | 10 | D4-D7 |
| 14 | A8-A11 | 17 | D8-D11 |
| 15 | B8-B11 | 24 | D12-D15 |
| 16 | C8-C11 | 4 | E0-E3 |
| 17 | D8-D11 | 11 | E4-E7 |
| 18 | E8-E11 | 18 | E8-E11 |
| 19 | F8-F11 | 25 | E12-E15 |
| 20 | G8-G11 | 5 | F0-F3 |
| 21 | A12-A15 | 12 | F4-F7 |
| 22 | B12-B15 | 19 | F8-F11 |
| 23 | C12-C15 | 26 | F12-F15 |
| 24 | D12-D15 | 6 | G0-G3 |
| 25 | E12-E15 | 13 | G4-G7 |
| 26 | F12-F15 | 20 | G8-G11 |
| 27 | G12-G15 | 27 | G12-G15 |

In video memory it is common that the rate at which the memory is read matches the rate at which the memory is written to. In other words, the memory is filled at the same rate at which it is emptied, although there may be a "latency period," which is the time period between when a particular location has a piece of data written to it and when that data is read out from that particular location. The latency is based on the size of the memory and the amount of data being stored in it. In embodiments of the invention, the latency can be reduced to a minimum value, where a particular memory location is read out at the first available moment after the block it belongs to is completely written. Description with reference to FIG. 3B illustrates how the line memory 100 is filled as the memory blocks are being read from it.

FIG. 3B illustrates how data fills the line memory 100 as it is being filled for the second time according to embodiments of the invention. Recall that data is written in scan order, A0-A3, B0-B3, etc. Also recall that the data is read in block order, A0-A3, A4-A7, etc. Therefore, after the first data A0-A3 has been read from the line memory 100 in FIG. 3A, from position 0, the next data A0-A3, corresponding to the next set of lines, for instance, is written to the line memory 100 in FIG. 3B. As described above, determining where the data is to be written is based on the write pointer, which is generated by the flow 200 in FIG. 5.

With reference back to FIG. 5, after the last block of data, G12-G15 has been written to memory location 27 of the line memory 100 of FIG. 3A, the process 240 exits in the "YES" direction to a process 250, where the write pointer is reset to "0." Differently than above, however, the write increment will be not be set to "1" for this second time through the line memory 100. As the line memory 100 is filled the second time through, with reference to FIG. 3B, the write pointer increments so that the written data coincides with an available space. Because the available spaces follow the locations of the previous block "A," 0, 7, 14, 21, the write pointer will also follow the same sequence.

In a process 260 of FIG. 5, the write increment is set to a new value based on a formula:

Write increment=Write increment/*N*+(Write increment%*N*)\**W*   Equation (1):

In the Example shown in FIGS. 3A-3E, the "N" value is 4 (number of rows in a block/line), and the W value is "7" (number of blocks in a line).

Equation 1 uses "integer" math to generate its new value, which means that the processing results in only integer values for the terms. Stepping through Equation 1 in detail, the first time that the process 260 is entered, the write increment value, as initialized in the process 210, is "1," which corresponds to how the line memory 100 of FIG. 3A was filled. Therefore, according to Equation 1, the new write increment value will be the sum of two terms. The first of those two terms is "write increment/N." Since the present write increment is "1" and the present N value is "4," the non-integer math result of write increment/N would be "¼," which means the integer result is "0." The second term in Equation 1 is "(Write increment % N)*W", where % is the modulo (remainder) operator. Thus, 1 modulo 4 is 1, which is multiplied by W (7) to yield "7." Therefore, the new write increment value for the second time through the line memory 100 (FIG. 3B) is 0+7, or "7."

Using the new write increment value of "7," with reference to FIG. 5, the line memory 100 of FIG. 3B is filled in the order of 0, 7, 14, 21, 1, 8, 15, 22 . . . . Note that the memory fill order exactly coincides with the order in which the data was read from the previously filled line memory 100 of FIG. 3A. One difference, however, is that the line memory 100 of FIG. 3A was read in "block" order but the line memory 100 of FIG. 3B is written in "raster" or "scan" order.

Reading the memory block 100 of FIG. 3B also involves setting a new read increment value. With reference back to FIG. 6, in a process 350 the read pointer is set to 0 and a new read increment value is set in a process 260 based on the size and number of blocks in the line memory 100.

In one embodiment the read increment is set as described in Equation (2) below:

Read increment=Read increment/*N*+(Read increment%*N*)\**W*   Equation (2):

As described above with reference to Equation (1), Equation (2) also uses integer math. Stepping through Equation (2) in detail, with reference to FIGS. 3B and 5, the read increment was initially "7" (W), as set the first time through the flow 300. Therefore, the first term of Equation (2) is "7/4," which in integer math yields "1." The second term is "7" modulo "4" (N), which is "3" (7 divided by 4 has 3 left over), multiplied by "7" (W) yields "21." Thus, the read increment value for the second time through the flow 300, coinciding with FIG. 3B, is the original "1" incremented by "21" to "22."

With reference to FIGS. 3B and 5, the first value read is at location 0, A0-A3, because the process 350 reset the read pointer to zero. In other embodiments the read pointer may be initialized to another value provided it matches with the write pointer reset in the process 250 of FIG. 5.

The location of the second set of data read from FIG. 3B is determined in the process 330 by adding the current read increment value, "22" to the present read pointer "0," which yields "22". Inspection of the line memory 100 in FIG. 3B reveals that indeed the contents of the location 22 is the data A4-A7, which is exactly the desired data to be read. The read pointer for the third set of data is set by the process 330, which for the third set of data in FIG. 3B is 22+22=44, but recall that the address wraps based on the number of memory locations, which for the case of the line memory 100 is "27," to yield a read pointer value "44"-"27", or "17." Inspection of FIG. 3B shows that indeed the third set of data to be read is properly A8-A11, which is stored in location "17." The final set of data A12-A15 is read from location 12, which, as directed by the process 330 of FIG. 6, is "17"+"22"="39," wrapped (subtracted) by "27" to yield "12." Data A12-A15 is indeed at location 12 of the memory block 100 in FIG. 3B.

For FIG. 3B, the Write and Read pointer locations, along with the data written to or read from those locations, is shown in Table B.

TABLE B

| Write location | Write data | Read location | Read data |
|---|---|---|---|
| 0 | A0-A3 | 0 | A0-A3 |
| 7 | B0-B3 | 22 | A4-A7 |
| 14 | C0-C3 | 17 | A8-A11 |
| 21 | D0-D3 | 12 | A12-A15 |
| 1 | E0-E3 | 7 | B0-B3 |
| 8 | F0-F3 | 2 | B4-B7 |
| 15 | G0-G3 | 24 | B8-B11 |
| 22 | A4-A7 | 19 | B12-B15 |
| 2 | B4-B7 | 14 | C0-C3 |
| 9 | C4-C7 | 9 | C4-C7 |
| 16 | D4-D7 | 4 | C8-C11 |
| 23 | E4-E7 | 26 | C12-C15 |
| 3 | F4-F7 | 21 | D0-D3 |
| 10 | G4-G7 | 16 | D4-D7 |
| 17 | A8-A11 | 11 | D8-D11 |
| 24 | B8-B11 | 6 | D12-D15 |
| 4 | C8-C11 | 1 | E0-E3 |
| 11 | D8-D11 | 23 | E4-E7 |
| 18 | E8-E11 | 18 | E8-E11 |
| 25 | F8-F11 | 13 | E12-E15 |
| 5 | G8-G11 | 8 | F0-F3 |
| 12 | A12-A15 | 3 | F4-F7 |
| 19 | B12-B15 | 25 | F8-F11 |
| 26 | C12-C15 | 20 | F12-F15 |
| 6 | D12-D15 | 15 | G0-G3 |
| 13 | E12-E15 | 10 | G4-G7 |
| 20 | F12-F15 | 5 | G8-G11 |
| 27 | G12-G15 | 27 | G12-G15 |

For filling the line memory 100 of FIG. 3C with the next set of data, the process 260 of FIG. 5 uses Equation (1) to determine that the write increment should be set to "22," and, similarly, the process 360 of FIG. 6 uses Equation (2) to determine that the read increment should be set to "19." The data written to and read from the line memory 100 of FIG. 3C is illustrated in Table C.

TABLE C

| Write location | Write data | Read location | Read data |
|---|---|---|---|
| 0 | A0-A3 | 0 | A0-A3 |
| 22 | B0-B3 | 19 | A4-A7 |
| 17 | C0-C3 | 11 | A8-A11 |
| 12 | D0-D3 | 3 | A12-A15 |
| 7 | E0-E3 | 22 | B0-B3 |
| 2 | F0-F3 | 14 | B4-B7 |
| 24 | G0-G3 | 6 | B8-B11 |
| 19 | A4-A7 | 25 | B12-B15 |
| 14 | B4-B7 | 17 | C0-C3 |
| 9 | C4-C7 | 9 | C4-C7 |
| 4 | D4-D7 | 1 | C8-C11 |
| 26 | E4-E7 | 20 | C12-C15 |
| 21 | F4-F7 | 12 | D0-D3 |
| 16 | G4-G7 | 4 | D4-D7 |
| 11 | A8-A11 | 23 | D8-D11 |
| 6 | B8-B11 | 15 | D12-D15 |
| 1 | C8-C11 | 7 | E0-E3 |
| 23 | D8-D11 | 26 | E4-E7 |
| 18 | E8-E11 | 18 | E8-E11 |
| 13 | F8-F11 | 10 | E12-E15 |
| 8 | G8-G11 | 2 | F0-F3 |
| 3 | A12-A15 | 21 | F4-F7 |
| 25 | B12-B15 | 13 | F8-F11 |
| 20 | C12-C15 | 5 | F12-F15 |
| 15 | D12-D15 | 24 | G0-G3 |
| 10 | E12-E15 | 16 | G4-G7 |
| 5 | F12-F15 | 8 | G8-G11 |
| 27 | G12-G15 | 27 | G12-G15 |

For filling the line memory 100 of FIG. 3D with the next set of data, the process 260 of FIG. 5 uses Equation (1) to determine that the write increment should be set to "19," and, similarly, the process 360 of FIG. 6 uses Equation (2) to determine that the read increment should be set to "25." The data written to and read from the line memory 100 of FIG. 3D is illustrated in Table D.

TABLE D

| Write location | Write data | Read location | Read data |
|---|---|---|---|
| 0 | A0-A3 | 0 | A0-A3 |
| 19 | B0-B3 | 25 | A4-A7 |
| 11 | C0-C3 | 23 | A8-A11 |
| 3 | D0-D3 | 21 | A12-A15 |
| 22 | E0-E3 | 19 | B0-B3 |
| 14 | F0-F3 | 17 | B4-B7 |
| 6 | G0-G3 | 15 | B8-B11 |
| 25 | A4-A7 | 13 | B12-B15 |
| 17 | B4-B7 | 11 | C0-C3 |
| 9 | C4-C7 | 9 | C4-C7 |
| 1 | D4-D7 | 7 | C8-C11 |
| 20 | E4-E7 | 5 | C12-C15 |
| 12 | F4-F7 | 3 | D0-D3 |
| 4 | G4-G7 | 1 | D4-D7 |
| 23 | A8-A11 | 26 | D8-D11 |
| 15 | B8-B11 | 24 | D12-D15 |
| 7 | C8-C11 | 22 | E0-E3 |
| 26 | D8-D11 | 20 | E4-E7 |
| 18 | E8-E11 | 18 | E8-E11 |
| 10 | F8-F11 | 16 | E12-E15 |
| 2 | G8-G11 | 14 | F0-F3 |
| 21 | A12-A15 | 12 | F4-F7 |
| 13 | B12-B15 | 10 | F8-F11 |
| 5 | C12-C15 | 8 | F12-F15 |
| 24 | D12-D15 | 6 | G0-G3 |
| 16 | E12-E15 | 4 | G4-G7 |
| 8 | F12-F15 | 2 | G8-G11 |
| 27 | G12-G15 | 27 | G12-G15 |

For filling the line memory 100 of FIG. 3E with the next set of data, the process 260 of FIG. 5 uses Equation (1) to determine that the write increment should be set to "25," and, similarly, the process 360 of FIG. 6 uses Equation (2) to determine that the read increment should be set to "13." The data written to and read from the line memory 100 of FIG. 3E is illustrated in Table E.

TABLE E

| Write location | Write data | Read location | Read data |
|---|---|---|---|
| 0 | A0-A3 | 0 | A0-A3 |
| 25 | B0-B3 | 13 | A4-A7 |
| 23 | C0-C3 | 26 | A8-A11 |
| 21 | D0-D3 | 12 | A12-A15 |
| 19 | E0-E3 | 25 | B0-B3 |
| 17 | F0-F3 | 11 | B4-B7 |
| 15 | G0-G3 | 24 | B8-B11 |
| 13 | A4-A7 | 10 | B12-B15 |
| 11 | B4-B7 | 23 | C0-C3 |
| 9 | C4-C7 | 9 | C4-C7 |
| 7 | D4-D7 | 22 | C8-C11 |
| 5 | E4-E7 | 8 | C12-C15 |

TABLE E-continued

| Write location | Write data | Read location | Read data |
|---|---|---|---|
| 3 | F4-F7 | 21 | D0-D3 |
| 1 | G4-G7 | 7 | D4-D7 |
| 26 | A8-A11 | 20 | D8-D11 |
| 24 | B8-B11 | 6 | D12-D15 |
| 22 | C8-C11 | 19 | E0-E3 |
| 20 | D8-D11 | 5 | E4-E7 |
| 18 | E8-E11 | 18 | E8-E11 |
| 16 | F8-F11 | 4 | E12-E15 |
| 14 | G8-G11 | 17 | F0-F3 |
| 12 | A12-A15 | 3 | F4-F7 |
| 10 | B12-B15 | 16 | F8-F11 |
| 8 | C12-C15 | 2 | F12-F15 |
| 6 | D12-D15 | 15 | G0-G3 |
| 4 | E12-E15 | 1 | G4-G7 |
| 2 | F12-F15 | 14 | G8-G11 |
| 27 | G12-G15 | 27 | G12-G15 |

Although only the first five patterns in the series of filling line memory 100 are illustrated in FIGS. 3A-3E, given enough cycles, the memory sequence will again arrive at the sequence illustrated in FIG. 3A and then the entire sequence will repeat. There is no requirement for this repetition, however, and embodiments of the invention in no way depend on this cyclic nature, but rather such a condition is an artifact of the methods described above.

FIGS. 4A-4C illustrate another embodiment of the invention to demonstrate that the non-buffered memory need not be regular sized, i.e., need not be sized in powers of 2, either in number of words, number of columns in a block, nor number of rows in a bloc to correctly operate using the described system and methods.

FIG. 4A illustrates a memory buffer 150 that stores five blocks of data, A-E, where each block is 5×3. Thus, according to the above descriptions, number of blocks in one line of memory (W)=5, number of pixel columns in the block (M)=5, and number of lines in the block (N)=3. The memory buffer 150 fills in the same manner as the example illustrated in FIG. 3A, in which the buffer 150 is filled in raster order, A0, B0, C0, etc. until memory location 14 is filled with E10-E14. In so filling, the write pointer was initialized in the process 210 (FIG. 5) as "0," and the read pointer was initialized as "1." At the conclusion of the write process, the memory 150 appears as it is in FIG. 4A.

The memory buffer 150 of FIG. 4A is read using an initial read pointer of "0," which was set in process 310 of FIG. 6. Next the read increment is set. Recall that above, with reference to FIG. 3A, that the read increment is initially set in the process 310 to the same value as W, which is "5" in this example. Therefore, the first step in reading the memory 150 is reading "M" number of bits beginning at position 0, which reads the five bits A0-A4. Next the read increment value (presently "5") is added to the original value of 0 to yield "5," and the next set of bits A5-A9 are read from memory location 5 of the memory buffer 150. The next location read is "10," where the data A10-A14 is read, completing the reading of block "A." Adding the read increment value "5" to the present location of "10," which is outside the memory 150. Recall from above that the memory address "wraps," and therefore the actual address to be read is the present value "15" subtracted from the maximum address from the memory buffer 150, which is "14," to yield "1," which is where the first bits of block "B" are located.

While the memory 150 of FIG. 4A is read, a second cycle of writing fills the memory a second time, in the pattern as shown in FIG. 4B. In FIG. 4B, the write increment is "5."

Recall from the above examples that the write increment for a given cycle is the same as the previous cycle's read increment. Or, the write increment can be calculated again using Equation (1) above, with the original write increment=1, N=3, and W=5. Therefore, in the second write cycle of filling the memory 150 of FIG. 4A, the data is filled in raster order, A0, B0, etc., in the same order that it was read from the memory 150 of FIG. 4A, i.e., memory locations 0, 5, 10, 1, 6, 11, 2, 7, 12 . . . 14.

Reading the memory 150 of FIG. 4B is straightforward after a new read pointer increment is calculated by Equation (2) above, with the initial read increment=5, N=3, and W=3. Therefore the new read pointer increment calculates to be "11." Then the memory 150 of FIG. 4B is read using the process flow 300 of FIG. 6. The read pointer is initialized to "0" in process 310, while the increment, as described directly above, is set using Equation (2) to "11." Thus, the first set of data A0-A4 is read from the location 0, while the second set of data A5-A9 is read from location 11. The address of the third set of data is generated by adding the read increment "11" to its present value of "11", yielding "22." Because that address is beyond the highest address of the memory 150, the wrapping function calculates the new address as 22−14="8," which is exactly where the third set of data A10-A14 is located. Reading the data in location 8 completes the reading of block "A."

Finally, as illustrated in FIG. 4C, the third cycle of writing data to the memory 150 is illustrated. For this cycle, the write pointer increment is calculated in Equation (1) above as "11," which was also the "read pointer increment" of the previous cycle. The writing then proceeds as described above with reference to the flow 200 of FIG. 5. When the memory 150 is being read, the read pointer increment is calculated using Equation (2) as "13," and the memory 150 read using the procedures described in the flow 300 of FIG. 6.

Thus, the inventive concepts described herein are equally successful for either regular memories (FIGS. 3A-3E), or irregular memories (FIGS. 4A-4C). In either case careful selection of the write and read pointers, devised from the concepts illustrated above, maintain a perfect inflow and outflow of information from a memory, changing raster-ordered data into block-ordered data, without requiring the use of multiple memories.

Figure 7:
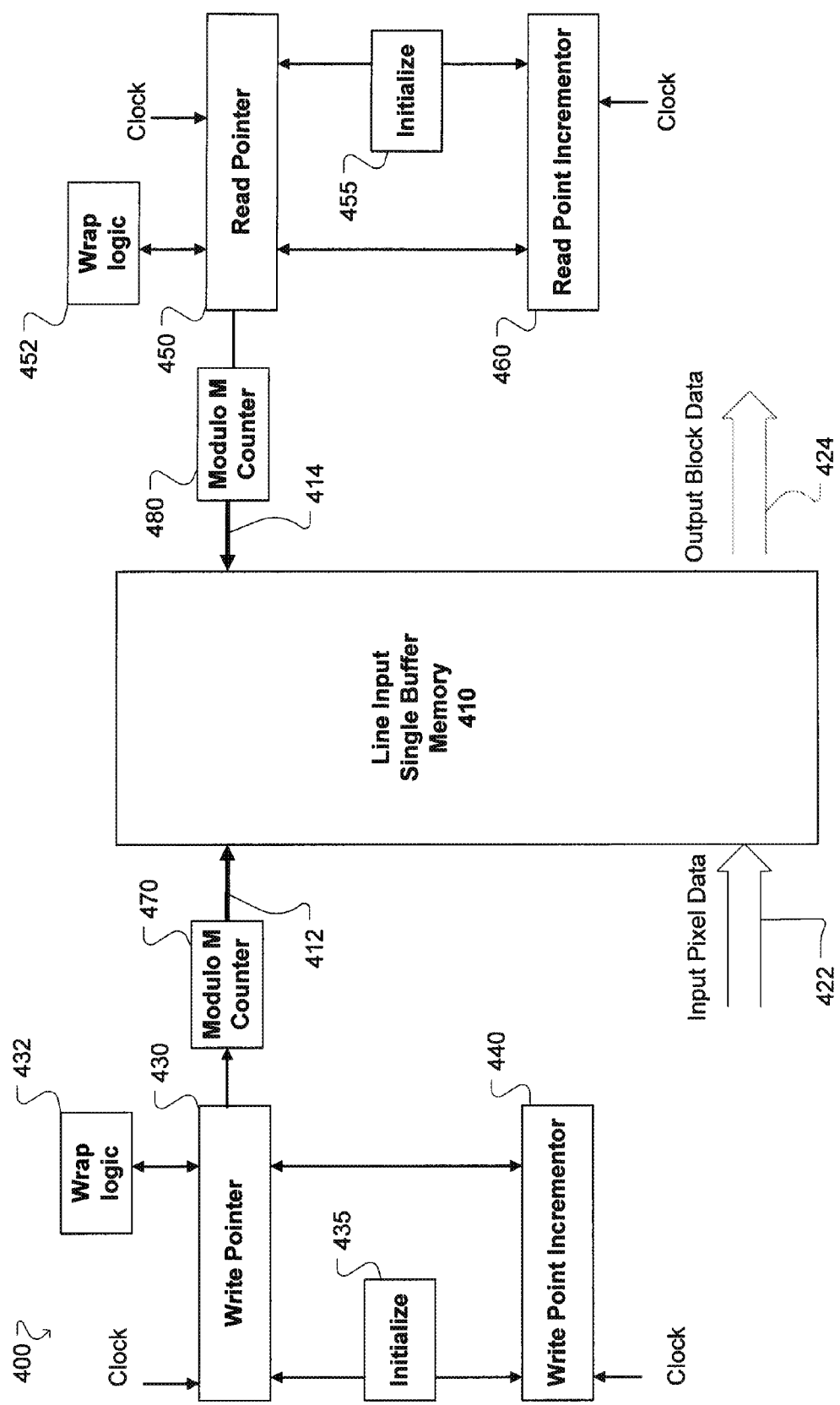
FIG. 7 is a block diagram of a non-buffered memory system according to embodiments of the invention.

FIG. 7 is a block diagram illustrating components in a non-buffered memory system 400 according to embodiments of the invention. Central to the non-buffered memory system 400 is an input non-buffered line memory 410 that includes a write address input 412 and read address input 414. Similarly, the input line buffer 410 includes a video data input 422 for accepting, in one embodiment, a stream of pixels in raster order as well as a video data output 424 for outputting, in one embodiment, pixels in macroblock order.

The system 400 includes a write pointer generator 430 and a write increment generator 440, also referred to as an incrementor 440. Each of the write pointer generator 430 and write increment generator 440 is coupled to an initialization circuit 435. As described above, the initialization circuit 435 sets an initial write pointer as well as an initial increment value that the system 400 uses to generate a new write pointer. In one embodiment the write pointer is initialized to "0," while the write increment is initialized to "1," although other initialization systems are possible without deviating from the scope of the invention.

The system 400 also includes a read pointer generator 450 and a read increment generator 460, also referred to as an incrementor 460. Each of the read pointer generator 450 and read increment generator 460 is coupled to an initialization circuit 455. As described above, the initialization circuit 455 sets an initial read pointer as well as an initial increment value that the system 400 uses to generate a new read pointer. In one embodiment the read pointer is initialized to "0," while the read increment is initialized to the width (in block size) of the memory buffer 410, although other initialization systems are possible without deviating from the scope of the invention.

Wrap around facilities 432, 452 perform the function of "wrapping" the address of the write and read pointers, respectively, after they have been incremented by their respective incrementors 440, 460 to a value that exceeds the number of memory locations or unique addresses in the memory buffer 410. In operation, with reference to the write pointer, when the write incrementor 440 increments the current write pointer to a value above the number of memory locations, or unique addresses in the memory buffer 410, the wrap around logic 432 subtracts the maximum address of the memory buffer from the value, so that the write pointer is always a valid address value for locations within the memory buffer 410 itself. The wrap around logic 452 works similarly for the read pointer, so that the read pointer always points to a valid address value for locations within the memory buffer 410.

Each of the write pointer 430, write incrementor 440, read pointer 450 and read incrementor 460 receives a clock signal. In some embodiments the pointers 430, 450 update every clock cycle, or every N clock cycles, while the incrementors 440, 460 increment only after an entire memory buffer 410 has been written to or read from, N*W clock cycles. Of course, various implementations are possible.

Modulo M counters 470 and 480 are used in conjunction with the write pointer 430 and read pointer 450, respectively, to generate addresses to the memory buffer 410 itself, from values provided by the respective pointers. More specifically, the Modulo M counters 470 and 480 provide the individual addressing for each separate pixel value in each column of each N×N or N×M block. For instance, if the block size is 8×8, the Modulo M counter 470 generates eight individual addresses based from a single write pointer output from the write pointer 430. The modulo M counter 480 works similarly, based on the read pointer 450, to generate M unique addresses to be read from the memory buffer 410. If the block size were instead 7×5, (7 columns by 5 lines) then the modulo M counter would generate 7 unique addresses each time the read pointer 450 generates a new base read pointer value.

The memory buffer system 400 is typically used as a component in a larger video system used for performing functions in video. An illustration of an example video system is illustrated in FIG. 8.

Figure 8:
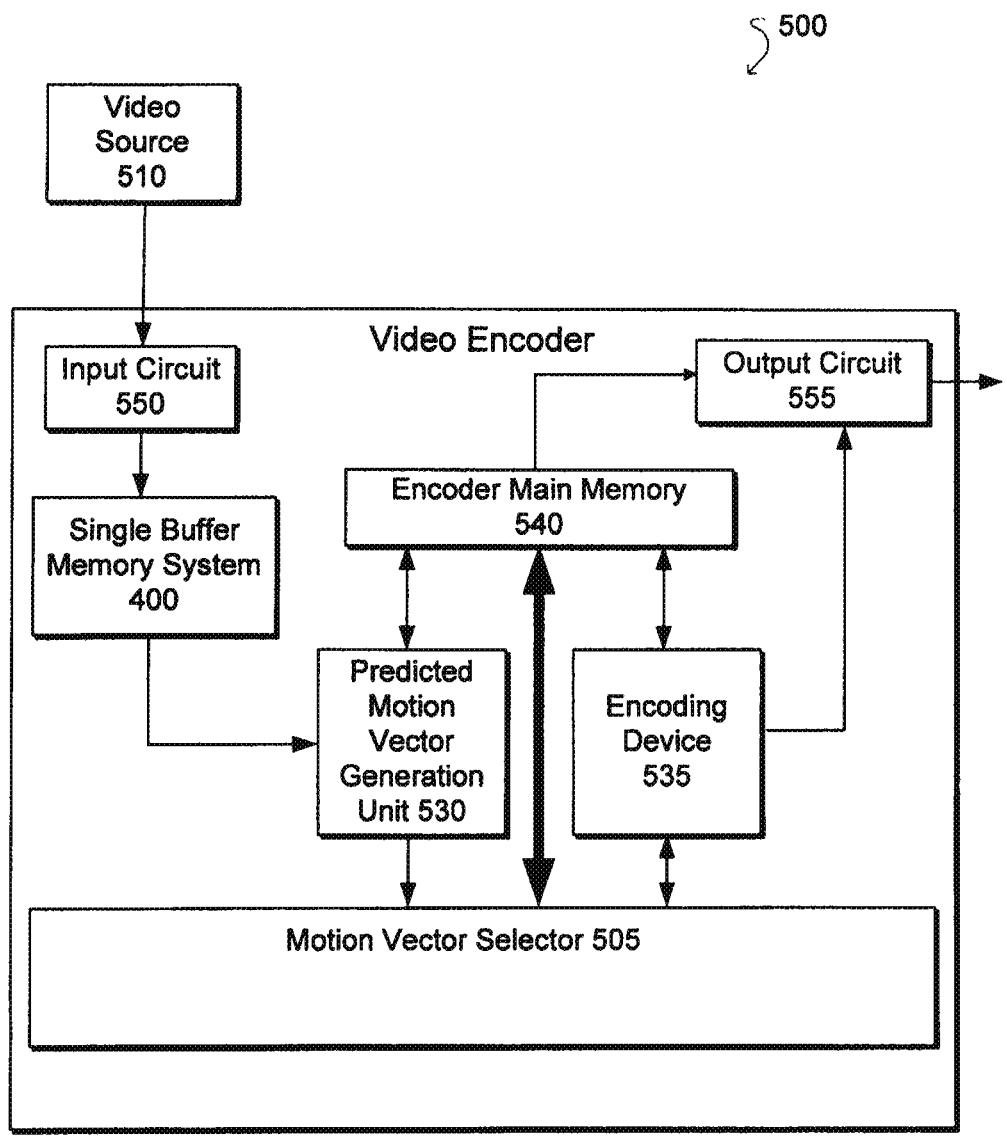
FIG. 8 is a block diagram of a video processor using a non-buffered memory system according to embodiments of the invention.

FIG. 8 is a block diagram of a video encoder 500 that includes the non-buffered memory system 400 as an integral portion. The video encoder 500 may be similar to a video encoder described in co-pending U.S. patent application Ser. No. 12/477,012, filed Jun. 2, 2009, entitled DIRECTIONAL CROSS HAIR SEARCH SYSTEM AND METHOD FOR DETERMINING A PREFERRED MOTION VECTOR, assigned to the assignee of the present application and incorporated by reference herein.

The video encoder 500 centrally includes a motion vector selector 505. The video encoder 500 receives video information from a video source 510 in raster format. The video source 510 represents any device, system, or structure capable of generating or otherwise providing uncompressed or previously compressed video information in raster format. The video source 510 could, for example, represent a television receiver, a VCR, a video camera, a storage device capable of storing raw video data, or any other suitable source of video information.

The video data from the video source 510 is brought into the video encoder 500 by an input circuit 550, which processes the video information from the video source for storage in the non-buffered memory system 400. The input circuit 550 may include an analog to digital converter, for example. The input circuit 550 stores the video data in the non-buffered memory system 400 in raster order using the techniques described above. Then, another component in the video encoder 500, such as the predicted motion vector generator 530, reads data from the non-buffered memory system 400 in block order, also as described above, so that the predicted motion vector generator can operate on block data. In some embodiments the input storage rate of the non-buffered memory system 400 equals the data rate of information being read from the memory system 400. After being stored, the information from the non-buffered memory system can be provided to the predicted motion vector generation unit 530, encoding device 535, output circuit 555, and the motion vector selector 500 as needed for processing of the video information from the video source 510.

The motion vector selector 505 receives a predicted motion vector from a predicted motion vector generation unit 530, and generates a final motion vector for the encoding device 535. The final motion vector may include a final full pixel motion vector. The encoding device 535 produces compressed video information based on the one or more final motion vectors. For example, the motion vector selector 505 may generate a final full pixel motion vector for each of several macroblocks associated with a video image or frame. The encoding device 535 may implement any suitable encoding technique such as CABAC or CAVLC, which are well known codings associated with the H.264 standard.

Each of the predicted motion vector generation unit 530, encoding device 535, and motion vector selector 505 interact with a main memory 540, which operates as standard memory, such as Random Access Memory, as needed by the connected devices.

The motion vector selector 505 outputs one or more final motion vector to the encoding device 535, which is passed to the output circuit 555 to generate the final output of the video encoder 500.

The video encoder 500 includes any hardware, such as ASIC, FPGA, DSP or microprocessor, software such as specially generated programs or codes structured to operate in conjunction with the hardware listed above, firmware, or combination thereof for estimating motion in video images or frames. Although the video encoder 500 is illustrated as a number of separate functional blocks, for convenience, the functions may be implemented as more or fewer components. Further, although the labels first, second, third, etc., are also used for convenience, a single component or process may in fact generate the described result, or, an implementation may use multiple components to generate a single result.

From the foregoing it will be appreciated that, although specific embodiments of the invention have been described herein for purposes of illustration, various modifications may be made without deviating from the spirit and scope of the invention.

More specifically, although the embodiments described above include various descriptions of the functions and components of the non-buffered memory system, and how it is integrated into a multitude of various products, there are many other possibilities to implementing the memory. For example, various initialization and addressing schemes are possible without deviating from the scope of the invention. Accordingly, the invention is not limited except as by the appended claims.

What is claimed is:

1. A method of operating a memory in a video device comprising:
   receiving a stream of video in scan order;
   determining a present value of a write pointer of a non-buffered line memory, the line memory including storage for a set of lines of video data;
   writing, in raster scan order, more than one group of data of a block of data from the stream of video in non-adjacent memory locations in the line memory, beginning at a location in the line memory related to the present value of the write pointer;
   determining a present value of a read pointer in the line memory; and
   reading, in block order, more than one group of data of a block of data from non-adjacent memory locations from the line memory, beginning at a location in the line memory related to the present value of the read pointer.

2. The method of managing a memory of claim 1, further comprising:
   generating a new present value of the write pointer after writing a group of data from the stream of video.

3. The method of managing a memory of claim 2 in which generating a new present value of the write pointer comprises adding the present value of the write pointer to a write pointer increment value.

4. The method of managing a memory of claim 3 in which the write pointer increment value is related to a size of blocks of data stored in the non-buffered line memory.

5. The method of managing a memory of claim 4 in which the write pointer increment value is further related to a capacity of the non-buffered line memory.

6. The method of managing a memory of claim 5 in which the capacity is measured by a number of block widths storable in the non-buffered line memory.

7. The method of managing a memory of claim 1, further comprising
   generating a new present value of the read pointer after reading a group of data from the non-buffered line memory.

8. The method of managing a memory of claim 7 in which generating a new present value of the read pointer comprises adding the present value of the read pointer to a read pointer increment value.

9. The method of managing a memory of claim 8 in which the read pointer increment is related to a size of block stored in the non-buffered line memory.

10. The method of managing a memory of claim 8 in which the read pointer increment value is initially set to a number equal to a width of the non-buffered line memory as measured by number of blocks evenly storable in the line memory.

11. A method of operating a video memory, comprising:
    receiving a portion of a video stream in raster order;
    storing more than one group of data of a block of data of the portion in the order received in non-sequentially addressed memory locations of a non-buffered video memory; and
    retrieving more than one group of data of a block of data from non-sequentially addressed memory locations of the non-buffered video memory in a block order.

12. The method of claim 11 in which storing the video stream in raster order comprises:
    initializing a write pointer;
    initializing a write pointer increment value; and
    writing the video stream to the non-buffered video memory in the order in which it was received.

13. The method of claim 12, further comprising:
    generating a new write pointer for a subsequent group of data by adding the value of the write pointer to the write pointer increment value.

14. The method of claim 13, further comprising:
    generating a series of addresses of the non-buffered video memory based on the new write pointer.

15. The method of claim 12, further comprising:
    after the non-buffered video memory has been fully written to, generating a new write pointer increment value.

16. The method of claim 15 in which generating a new write pointer increment value is related to a present write pointer increment value, a size of blocks stored in the non-buffered video memory, and related to a number of widths of data blocks capable of being stored in a single line of the non-buffered video memory.

17. The method of claim 11, in which retrieving data from the non-buffered video memory in block order comprises:
    generating a first and a subsequent address based on a read pointer and a read pointer increment value.

18. The method of claim 17 in which the read pointer increment value is related to a present write pointer increment value, a size of blocks stored in the non-buffered video memory, and related to a number of widths of data blocks capable of being stored in a single line of the non-buffered video memory.

19. A video system comprising: a non-buffered video memory; a write pointer calculator; a write pointer incrementor structured to generate an increment value based from a block size of data to be stored in the non-buffered video memory, the generated increment value causing more than one group of data of a block of data to be stored in non-adjacent locations; a read pointer calculator; a read pointer incrementor structured to generate an increment value based from the block size, the generated increment value causing more than one group of data of a block of data to be retrieved from non-adjacent locations; a modulo counter related to the block size; an address generator structure to generate a set of write addresses in the non-buffered video memory from outputs from the write pointer calculator and the modulo counter.

20. The video system of claim 19, further comprising a write initializing facility structured to generate an initial value for the write pointer calculator and the write pointer incrementor.

21. The video system of claim 19, further comprising a read initializing facility structured to generate an initial value for the read pointer calculator and the read pointer incrementor.

22. The video system of claim 19, further comprising:
    a second modulo counter; and
    a second address generator structured to generate a set of read addresses in the non-buffered video memory from outputs from the read pointer calculator and the second modulo counter.

23. An article comprising a non-transitory machine-accessible medium having associated data that, when executed, results in a machine:
    receiving a portion of a video stream in raster order;
    storing more than one group of data of a block of data of the portion in the order received in non-sequentially addressed memory locations of a non-buffered video memory; and
    retrieving more than one group of data of a block of data from non-sequentially addressed memory locations of the non-buffered video memory in a block order.

24. The article of claim 23 in which storing the video stream in raster order comprises:
- initializing a write pointer;
- initializing a write pointer increment value; and
- writing the video stream to the non-buffered video memory in the order in which it was received.

25. The article of claim 24, further comprising:
- generating a new write pointer for a subsequent group of data by adding the a value of the write pointer to the write pointer increment value.

26. The article of claim 25, further comprising:
- generating a series of addresses of the non-buffered video memory based on the new write pointer.

27. The article of claim 24, further comprising:
- after the non-buffered video memory has been fully written to, generating a new write pointer increment value.

28. The article of claim 27 in which generating a new write pointer increment value is related to a present write pointer increment value, a size of blocks stored in the non-buffered video memory, and related to a number of widths of data blocks capable of being stored in a single line of the non-buffered video memory.

\* \* \* \* \*